United States Patent
Ohlerich (10) Patent No.: US 10,199,816 B2
(45) Date of Patent: Feb. 5, 2019

(54) WIND TURBINE ROTOR BLADE HAVING A LIGHTNING RECEPTOR BASE AND METHOD FOR MAKING THE SAME

(71) Applicant: Nordex Energy GmbH, Hamburg (DE)

(72) Inventor: Nick Ohlerich, Rostock (DE)

(73) Assignee: Nordex Energy GmbH, Hamburg (DE)

(*) Notice: Subject to any disclaimer, the term of this patent is extended or adjusted under 35 U.S.C. 154(b) by 744 days.

(21) Appl. No.: 14/680,964

(22) Filed: Apr. 7, 2015

(65) Prior Publication Data

US 2015/0292487 A1 Oct. 15, 2015

(30) Foreign Application Priority Data

Apr. 10, 2014 (EP) ..................... 14164232

(51) Int. Cl.
| | | |
|---|---|---|
| *F03D 80/30* | (2016.01) | |
| *F03D 1/06* | (2006.01) | |
| *H02G 13/00* | (2006.01) | |

(52) U.S. Cl.
CPC .......... *H02G 13/80* (2013.01); *F03D 1/0675* (2013.01); *F03D 80/30* (2016.05); *H02G 13/00* (2013.01); *F05B 2230/60* (2013.01); *Y02E 10/721* (2013.01); *Y02P 70/523* (2015.11)

(58) Field of Classification Search
CPC ........ F03D 80/30; F03D 1/0675; F03D 13/10; H02G 13/80; H02G 13/00; F05B 2230/60
See application file for complete search history.

(56) References Cited

U.S. PATENT DOCUMENTS

| 7,883,321 | B2 | 2/2011 | Bertelsen |
| 8,105,035 | B2 | 1/2012 | Bertelsen |
| 8,133,031 | B2 | 3/2012 | Arinaga et al. |
| 2006/0280613 | A1 | 12/2006 | Hansen |
| 2007/0081900 | A1 | 4/2007 | Nies |
| 2009/0257881 | A1* | 10/2009 | Ostergaard Kristensen ................ F03D 11/0033 416/229 R |
| 2012/0020791 | A1* | 1/2012 | Flemming .............. H02G 13/00 416/146 R |

(Continued)

FOREIGN PATENT DOCUMENTS

| CN | 202628403 U | 12/2012 | |
| GB | 2519333 A * | 4/2015 | ........... F03D 1/0675 |
| KR | 10-2010-0115139 A | 10/2010 | |

(Continued)

*Primary Examiner* — Jason Shanske
*Assistant Examiner* — Jesse Prager
(74) *Attorney, Agent, or Firm* — Walter Ottesen, P.A.

(57) ABSTRACT

A wind turbine rotor blade has a blade root, a lightning protection conductor for dissipating a lightning current toward the blade root, a suction side, a pressure side, a lightning receptor arranged on the suction side, a lightning receptor arranged on the pressure side, and an integrally formed lightning receptor base, which is arranged in the wind turbine rotor blade and on which the two lightning receptors and the lightning protection conductor are fastened, wherein the lightning receptor base includes two fastening rings, which each have an internal thread, into which one of the two lightning receptors is screwed, and an outer diameter and an outer side, wherein the outer sides of the fastening rings are arranged with a spacing of less than one outer diameter from one another.

7 Claims, 4 Drawing Sheets

(56) References Cited

U.S. PATENT DOCUMENTS

2012/0043979 A1* 2/2012 Jakobsen ............. G01R 31/026
                                                        324/691
2013/0149154 A1    6/2013 Kuroiwa et al.

FOREIGN PATENT DOCUMENTS

WO         2011/080177 A1    7/2011
WO    WO 2015055216 A1 *    4/2015  ........... F03D 1/0675

* cited by examiner

Fig. 8

WIND TURBINE ROTOR BLADE HAVING A LIGHTNING RECEPTOR BASE AND METHOD FOR MAKING THE SAME

CROSS REFERENCE TO RELATED APPLICATION

This application claims priority of European patent application no. 14 164 232.2, filed Apr. 10, 2014, the entire content of which is incorporated herein by reference.

FIELD OF THE INVENTION

The invention relates to a wind turbine rotor blade having two lightning receptors, which are arranged on a suction side and a pressure side, and an integrally formed lighting receptor base, which is arranged in the wind turbine rotor blade and on which the two lightning receptors and a lightning protection conductor are fastened, and to a method for making such a wind turbine rotor blade.

BACKGROUND OF THE INVENTION

It is known to protect wind turbine rotor blades from damage by a stroke of lightning using a lightning protection device. For this purpose, a plurality of lightning receptors can be arranged on the rotor blade. The current from a flash of lightning striking such a lightning receptor is dissipated via a lightning protection conductor toward the blade root and from there via the nacelle and the tower of the wind turbine into the ground.

The lightning receptors and all other elements of the lightning protection device should be arranged in such a way that flashes of lightning only strike the lightning receptors. Each stroke of lightning at another location, whether it be another electrically conductive element of the wind turbine rotor blade such as, for example, a supporting structure consisting of a carbon fiber material, an electrical heating device or another electrical line, can under certain circumstances result in irreparable damage to the rotor blade. This also applies to flashes of lightning which strike a lightning receptor base or the lightning protection conductor itself at a distance from a lightning protection receptor.

U.S. Pat. No. 7,883,321 discloses a wind turbine rotor blade having two lightning receptors arranged opposite one another in the region of the blade tips. The lightning receptors are screwed to in each case one lightning receptor base. The two receptor bases are coupled to one another via a bolt and are connected separately from one another to a central lightning protection conductor via electrical lines.

WO 2011/080177 A1 discloses a lightning protection device for a wind turbine rotor blade. A conductive surface coating acts as lightning receptor and is coupled electrically, via rods, to a lightning protection conductor in the interior of the rotor blade.

U.S. Pat. No. 8,105,635 discloses a lightning protection device for a wind turbine rotor blade in which mutually opposite lightning receptors are coupled to a lightning protection conductor via a rod.

U.S. Pat. No. 8,133,031 discloses a wind turbine rotor blade in which two lightning receptors arranged on the pressure and suction sides are screwed to an integrally formed lightning receptor base in the region of the blade tip. The lightning receptor base is a solid, large-volume block consisting of an electrically conductive material.

SUMMARY OF THE INVENTION

It is an object of the invention to provide a wind turbine rotor blade having two lightning receptors which are arranged on the pressure and suction sides and which are both fastened on an integrally formed lightning receptor base which is simpler and less expensive to produce and in which the risk of a stroke of lightning in a region other than in the lightning receptors is reduced and to provide a method for making such a wind turbine rotor blade.

This object is achieved by the wind turbine rotor blade having a blade root, a lightning protection conductor for dissipating a lightning current toward the blade root, a suction side, a pressure side, a lightning receptor arranged on the suction side, a lightning receptor arranged on the pressure side, and an integrally formed lightning receptor base, which is arranged in the wind turbine rotor blade and on which the two lightning receptors and the lightning protection conductor are fastened. The lightning receptor base includes two fastening rings, which each have an internal thread, into which one of the two lightning receptors is screwed, and an outer diameter, wherein the outer sides of the fastening rings are arranged with a spacing of less than one outer diameter from one another.

The wind turbine rotor blade can be intended for a wind turbine having a substantially horizontal axis. It can be produced from a fiber composite material, in particular from two half-shells connected to one another. It can have an aerodynamic shroud which is formed, for example, by the outer sides of the two half-shells, and one or more strips, for example consisting of glass-fiber-reinforced or carbon-fiber-reinforced plastic. The two half-shells can be connected to one another via one or more webs, which can be arranged in particular between two mutually opposite main straps.

The lightning protection conductor can extend substantially over the entire length of the wind turbine rotor blade, in particular from a connection point in the region of the blade root up to the region of the blade tip. There, it can be connected to the lightning receptor base. The electrical connection between the lightning protection conductor and the two lightning receptors can be produced via the lightning receptor base.

The two lightning receptors consist of an electrically conductive material, preferably of metal, and are arranged on the outer side of the wind turbine rotor blade so that they terminate approximately flush with the suction side or with the pressure side. They can be arranged opposite one another in the region of the blade tip, but also spaced apart therefrom. It is also possible for a plurality of pairs of lightning receptors to be provided which are arranged with different spacings from the blade tip, with in each case a lightning receptor base being assigned to each pair. The lightning receptors and the lightning receptor base can be arranged in a longitudinal section or in a region close to the rear edge of the wind turbine rotor blade, in which the spacing between the suction side and the pressure side is so small that access to the interior of the rotor blade is not readily possible. For example, the spacing can be 30 cm or less or 20 cm or less.

An essential part of the lightning receptor base according to the invention are the two fastening rings, which are arranged closely adjacent to one another. The outer sides of the fastening rings are arranged with a spacing of less than an outer diameter of a fastening ring. Each fastening ring has an internal thread, into which one of the two lightning receptors has been screwed. For this purpose, the lightning receptor can have a bolt-shaped section with a corresponding external thread. In the simplest case, the lightning receptors consist of a threaded bolt with a disk-shaped head, for example. A multi-part embodiment of the lightning receptors is also possible, for example with a disk into which a threaded bolt is inserted. The threads are dimensioned such that a lightning stroke current of 200 kA, for example, can be dissipated without any damage via the screw connection.

The lightning receptor base according to the invention has very compact dimensions. At the same time, it enables secure fastening of the two lightning receptors and damage-free dissipation of the lighting stroke current. Owing to its compact configuration, it is particularly material-saving. A further advantage consists in that the lightning receptor base, owing to its compact shape, has a very low degree of attractiveness for flashes of lightning, as a result of which the probability of a lightning strike past a lightning receptor into the receptor base is substantially reduced. The fastening rings are each closed in the form of a ring around the internal thread. They can be in the form of a circular ring.

In one embodiment, an edge radius at the outer circumferences of the two fastening rings is 3 mm or more. Such markedly rounded-off edges counteract local field intensity maxima and additionally reduce the attractiveness of the lightning receptor base for a lightning strike.

In one embodiment, the two fastening rings are arranged laterally next to one another. In this arrangement, the height of the entire lightning receptor base can be restricted substantially to the length of the internal thread, with the result that the lightning receptor base can also be used in regions of the wind turbine rotor blade with a very small profile thickness. In addition, the lightning receptors can be screwed deep into the internal thread or screwed through the fastening rings without the threaded bolts of the lightning receptors hitting one another.

In one embodiment, the two fastening rings each have a longitudinal axis which passes through the center point of the fastening ring. The two longitudinal axes are arranged at an angle in the range of from 0° to 30° with respect to one another, with the result that one of the longitudinal axes perpendicularly intersects the suction side and the other of the longitudinal axes perpendicularly intersects the pressure side. In the case of an arrangement of the lightning receptors between a profile end edge and a position with a maximum profile thickness, the angle can be in particular in the range of from 3° to 20°. In this case, the configuration of the lightning receptor base already presets the correct angular arrangement of the two lightning receptors with respect to one another so that, when the lightning receptor base is fastened in the rotor blade in the intended position, the correct arrangement of the two lightning receptors is fixed.

In one embodiment, the lightning receptor base has a fastening section, which is connected to the lightning protection conductor and is arranged between the two fastening rings. The fastening section can be in the form of a tube or bar, for example, and can be welded to the lightning protection conductor. The arrangement of the fastening section between the two fastening rings contributes to the compact configuration of the lightning receptor base. In particular, the lightning receptor base can consist substantially or exclusively of the two fastening rings and the fastening section.

In one embodiment, the two fastening rings are welded to one another and/or to the fastening section. In this case, in particular the fastening rings can be manufactured in a particularly inexpensive manner, for example as rotary parts. Alternatively, the lightning receptor base can be manufactured integrally, for example as a closed-die drop-forged part.

In one embodiment, the two fastening rings have a smaller outer diameter than the lightning receptors. As a result, the lightning receptor base is even less attractive to a flash of lightning striking than the lightning receptors.

The abovementioned object is likewise achieved by a method for making a wind turbine rotor blade, the method having the following steps:
    providing two rotor blade half-shells,
    providing an integral lightning receptor base, which has a first fastening ring with a first internal thread and a second fastening ring with a second internal thread,
    screwing a first threaded fastener into the first internal thread and a second threaded fastener into the second internal thread,
    fastening the lightning receptor base on an inner side of one of the rotor blade half-shells,
    assembling the two rotor blade half-shells,
    producing a first bore through a wall of one of the rotor blade half shells in the region of the first threaded fastener and a second bore through a wall of the other rotor blade half-shell in the region of the second threaded fastener,
    removing the two threaded fasteners through the respective bore,
    screwing a first lightning receptor through the first bore into the first internal thread and a second lightning receptor through the second bore into the second internal thread.

In respect of the features and advantages of the method, reference is first made to the explanations above relating to the wind turbine rotor blade, which apply correspondingly. The method can be used in particular for producing a wind turbine rotor blade having the features described above. The method is a simple and practicable possibility for producing such a wind turbine rotor blade.

In the method according to the invention, the integral lightning receptor base is first fastened on an inner side of one of the rotor blade half-shells, for example with laminate layers and an adhesive, for example adhesive resin, which are applied in the region of the fastening section or of the lightning protection conductor connected thereto. The two screws or threaded fasteners screwed into the internal thread of the lightning receptor base reliably prevent the ingress of adhesive or other contaminants into the threaded bores in the lighting receptor base in this case and during assembly of the two rotor blade half-shells, generally likewise using an adhesive. At the same time, the two threaded fasteners can be used as orientation in the production of the two bores through the walls of the two half-shells since their arrangement in the rotor blade assembled from the two rotor blade half-shells characterizes the position of the two internal threads into which the lightning receptors are screwed.

By virtue of the use of a prefabricated lightning receptor base, which already has the two threaded bores, and the production of the bores through the rotor blade walls only once the lightning receptor base has been fastened, particularly simple fitting of the entire lightning protection device which is not very susceptible to faults is achieved.

In one embodiment, the method has the following further step:
    identifying the position of one of the two threaded fasteners optically from an outer side of the assembled half-shells.

As already mentioned, the arrangement of the threaded fasteners can act as orientation for the production of the bores through the rotor blade walls. In principle, the position of the threaded fasteners can be fixed as desired for this purpose, for example using magnets. When using sufficiently large threaded fasteners or screws, preferably with a characteristically structured screw head, in particular with a hexagon socket, it is in many cases possible, however, to identify the two threaded fasteners through the rotor blade wall merely by eye. The production of the bores at the correct position is particularly simple as a result.

In one embodiment, the lightning receptors screwed into the internal threads terminate flush with an outer side of the rotor blade half-shell in question without touching the bore surrounding them. In other words, the bore is so large that a free space remains around the screwed-in lightning receptors. The fastening of the lightning receptors is performed exclusively via the lightning receptor base, and a force effect on the lightning receptors, in particular in the case of an elastic deformation of the wind turbine rotor blade, does not occur. This contributes to a permanent fastening of the lightning protection device.

In one embodiment, the method has the following further step:

closing the gaps between the lightning receptors and the bores surrounding them once the two lightning receptors have been screwed in.

In particular, the gaps can be closed by a permanently elastic compound. As a result, sealing-off of the interior of the wind turbine rotor blade is achieved without the possibility of forces being exerted on the lightning protection device from the rotor blade wall.

In one embodiment, the threaded fasteners are screwed so far into the receptor base that the heads of the threaded fasteners are each arranged with a spacing of less than 10 mm from the inner side of one of the rotor blade half-shells once the two rotor blade half-shells have been assembled. Preferably, an even smaller spacing of, for example, less than 5 mm can be selected. An arrangement of the threaded fasteners as far as possible directly below the inner side of the respective rotor blade half-shell simplifies the process of finding the threaded fasteners from the outside.

In one embodiment, a fastening plate is fastened on the lightning receptor base with one of the threaded fasteners and, in order to fasten the lightning receptor base on the inner side of one of the rotor blade half-shells, the fastening plate is adhesively bonded to the inner side of the rotor blade half-shell. The fastening plate enables simple adhesive bonding over a relatively large area to the rotor blade half-shell. In addition, the lightning receptor base itself can be adhesively bonded to the inner side of the rotor blade half-shell or to the fastening plate. A particular advantage consists in that, once the fastening plate has been fastened on the inner side of the rotor blade half-shell, readjustment of the position of the lightning receptor base is still possible, at least by rotation. The lightning receptor base can therefore be oriented precisely simply before it is ultimately fixed. In addition, the head of the threaded fastener used for fastening the fastening plate to the lightning receptor base can be recessed into the fastening plate so that it terminates flush with the surface thereof. After the adhesive bonding of the fastening plate to the rotor blade half-shell, it is then located directly on the inner side of the rotor blade half-shell so that it is particularly easily visible from the outside.

BRIEF DESCRIPTION OF THE DRAWINGS

The invention will now be described with reference to the drawings wherein:

FIG. 7 shows the arrangement shown in FIG. 6 after production of the bores; and, FIG. 8 shows the arrangement shown in FIG. 7 with the lightning receptors screwed in.

DESCRIPTION OF THE PREFERRED EMBODIMENTS OF THE INVENTION

Figure 1:
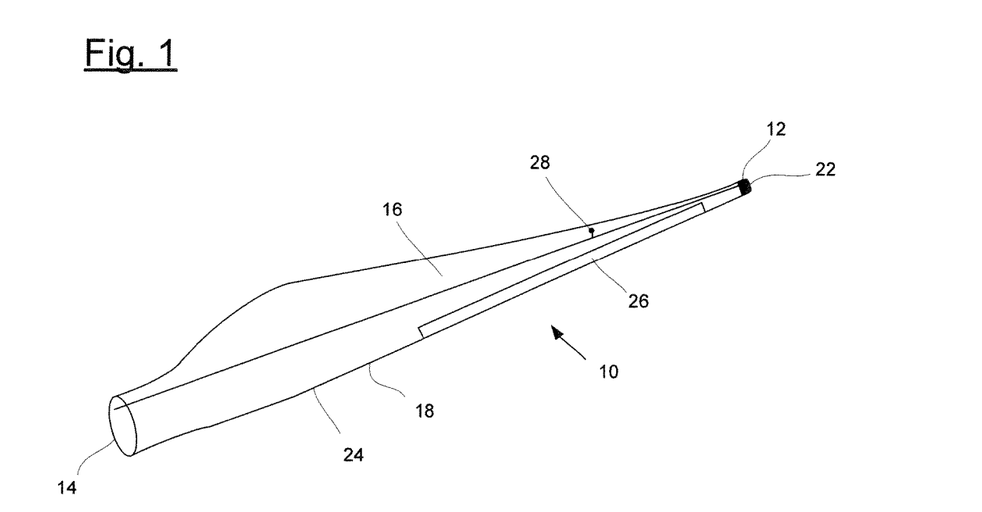
FIG. 1 shows a wind turbine rotor blade according to the invention in a simplified, perspective illustration.

The wind turbine rotor blade 10 shown in FIG. 1 has a blade tip 12, a blade root 14, a pressure side 16 and a suction side 18. A lightning protection conductor 20 leads from the blade root 14 into the region of the blade tip 12, where it is connected to a blade tip lightning receptor 22. In the region of the profile nose edge 24, an electrical heating device 26 is indicated as an additional option.

A lightning receptor 28 arranged on the pressure side 16 is spaced apart from the blade tip 12. On the suction side 18, a further lightning receptor 30 (see FIG. 8) is positioned approximately opposite the lightning receptor 28. The two lightning receptors 28, 30 are screwed to a lightning receptor base 32 (see, for example, FIGS. 2A and 2B) in the interior of the wind turbine rotor blade 10. The lightning receptor base 32 is connected to the lightning protection conductor 20.

Figure 2A:
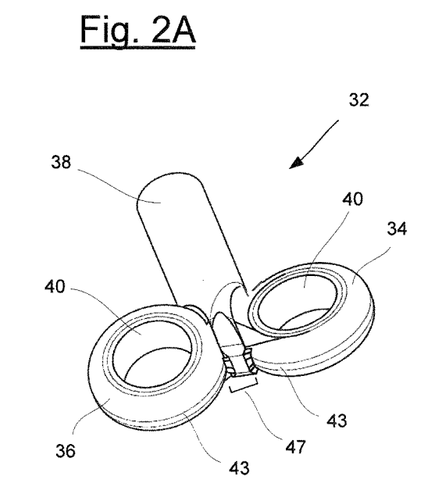
FIG. 2A shows a lightning receptor base of the wind turbine rotor blade shown in FIG. 1 in a perspective illustration.
Figure 2B:
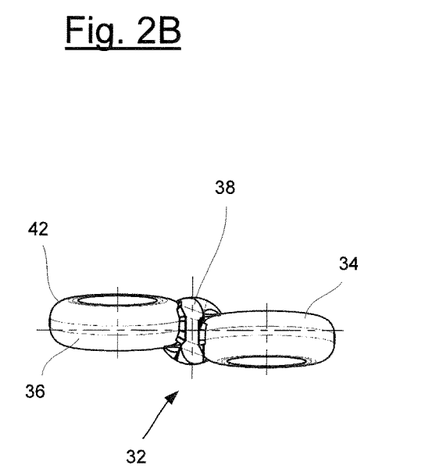
FIG. 2B shows the lightning receptor base in FIG. 2A in a plan view.

FIGS. 2A and 2B show the lightning receptor base 32, which has two fastening rings 34, 36 and a fastening section 38 arranged therebetween. The two fastening rings 34, 36 are arranged closely adjacent to one another. They each have an outer diameter in the range of from 30 mm to 40 mm and have a spacing 47 in the range of from 5 mm to 20 mm between their outer sides 43. Each of the two fastening rings 34, 36 has an M20 internal thread 40.

The two fastening rings 34, 36 are arranged laterally next to one another. As can clearly be seen in FIG. 2B, however, they do not lie precisely in one plane, but are tilted at an angle of approximately 15° relative to one another. All of the outer edges 42, in particular at the outer circumferences of the fastening rings 34, 36, are rounded off with a radius of approximately 4 mm.

The lightning receptor base 32 is assembled by welding the two fastening rings 34, 36 to the fastening section 38 arranged between the two fastening rings 34, 36.

Figure 3:
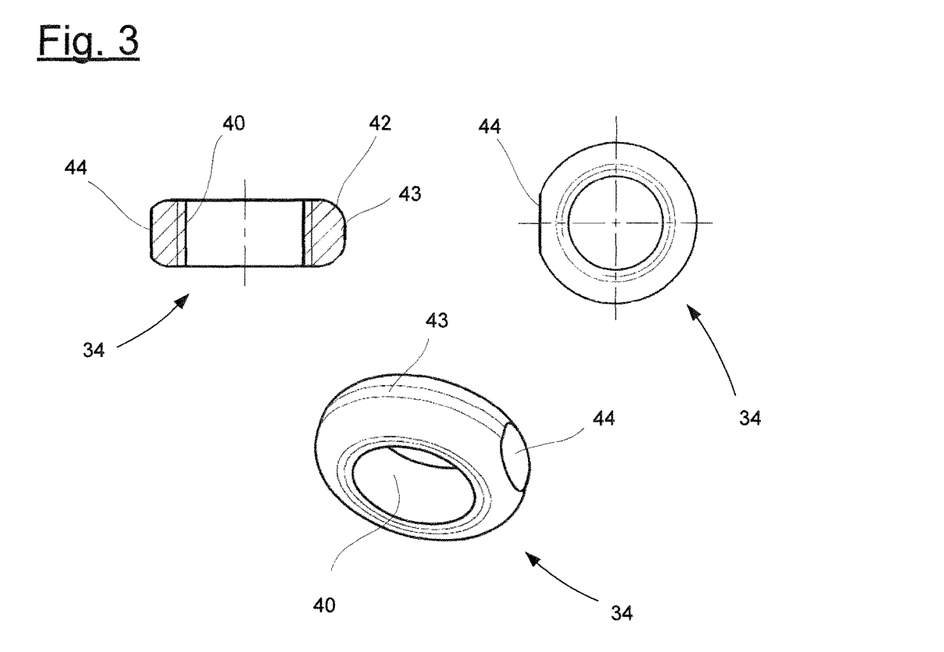
FIG. 3 shows a fastening ring of the lightning receptor base from FIGS. 2A and 2B in three different views.

FIG. 3 shows a fastening ring 34 of the lightning receptor base 32 in cross section at the top left, in a plan view from above at the top right, and in a perspective illustration at the bottom. The rounded edges 42 at the outer circumferences and a lateral flattened portion 44 on the outer side 43, which forms a contact area for welding to the fastening section 38, can be seen particularly clearly in the cross-sectional illustration.

Figure 4:
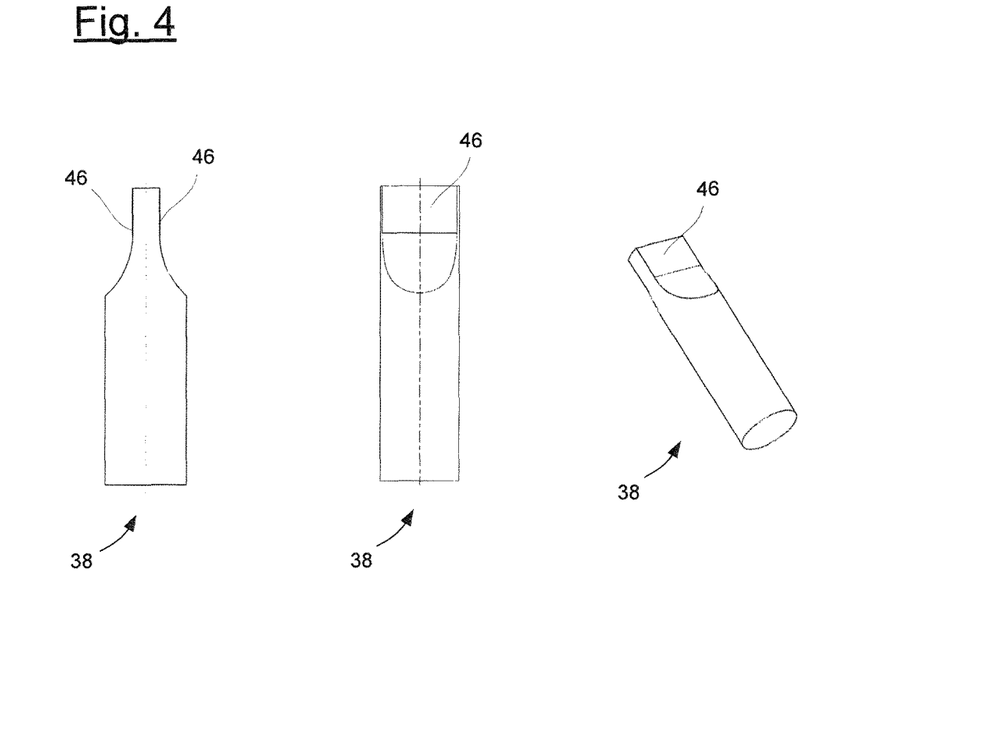
FIG. 4 shows the fastening section of the lightning receptor base from FIGS. 2A and 2B in three different views.

FIG. 4 shows the fastening section 38 in two plan views from different directions and additionally in a perspective illustration. The fastening section 38 has a circular-cylindrical basic shape with a diameter in the range of from 10 mm to 20 mm. At one end, which is arranged between the two fastening rings 34, 36, there are two mutually opposite flattened portions 46, which ensure contact with the flattened portions 44 on the fastening rings 34, 36 over a large area during welding.

Figure 5:
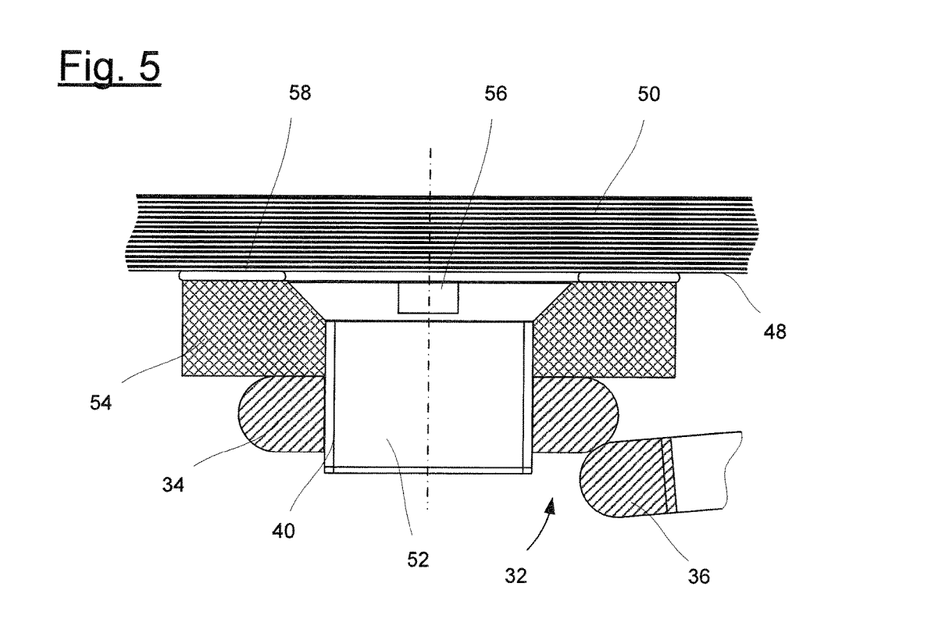
FIG. 5 shows a detail illustration for the fastening of the lightning receptor base shown in FIGS. 2A and 2B to a rotor blade half-shell in a sectioned and schematic illustration.

FIG. 5 shows schematically how the lightning receptor base 32 is fastened on the inner side 48 of a rotor blade half-shell 50. The two fastening rings 34, 36 of the lightning receptor base 32 are shown in the lower part of the figure. A first threaded fastener 52, namely a countersunk head screw, is screwed into the internal thread 40 of the fastening ring 34. This countersunk head screw is used to screw a fastening plate 54, which in the example consists of a glass fiber composite material, to the lightning receptor base 32. The upper side of the countersunk head of the first threaded fastener 52, which has a hexagon socket 56, terminates approximately flush with the upper side of the fastening plate 54.

The fastening plate 54 is fastened with adhesive 58 on the inner side 48 of the rotor blade half-shell 50. The upper side of the threaded fastener 52 is therefore located in the direct vicinity of the inner side 48, with the result that the threaded fastener 52 is particularly easily visible from the outside.

Figure 6:
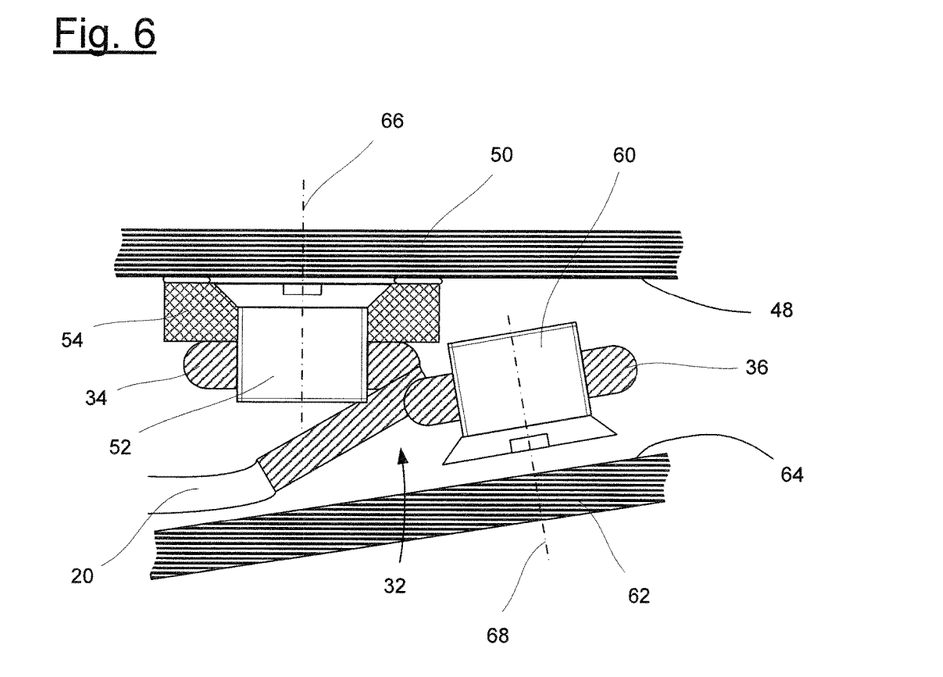
FIG. 6 shows a detail illustration of the lightning receptor base shown in FIGS. 2A and 2B fastened between the two rotor blade half-shells prior to introduction of the bores.

FIG. 6 shows another view of the lightning receptor base 32, in which the two fastening rings 34, 36 and additionally the fastening section 38 can be seen. In the illustration shown in FIG. 6, the fastening plate 54 is furthermore screwed to the lightning receptor base 32 via the first threaded fastener 52, and the fastening plate 54 is adhesively bonded to the inner side 48 of the rotor blade half-shell 50. A second threaded fastener 60 is screwed into the fastening ring 36. Then, the rotor blade half-shell 50 has been assembled with a further rotor blade half-shell 62 so that the lightning receptor base 32 is arranged completely in the interior of the wind turbine rotor blade 10.

The second threaded fastener 60 is likewise a countersunk head screw. It is screwed so far into the fastening ring 36 that its head has a spacing from the inner side 64 of the further rotor blade half-shell 62 of less than 10 mm.

The longitudinal axes 66, 68 of the two threaded fasteners, which correspond to the longitudinal axes of the two threaded bores in the fastening rings 34, 36, are illustrated by dash-dotted lines in FIG. 6. It can be seen that the longitudinal axis 66 is arranged perpendicular to the rotor blade half-shell 50 and the other longitudinal axis 68 is arranged perpendicular to the further rotor blade half-shell 62.

Figure 7:
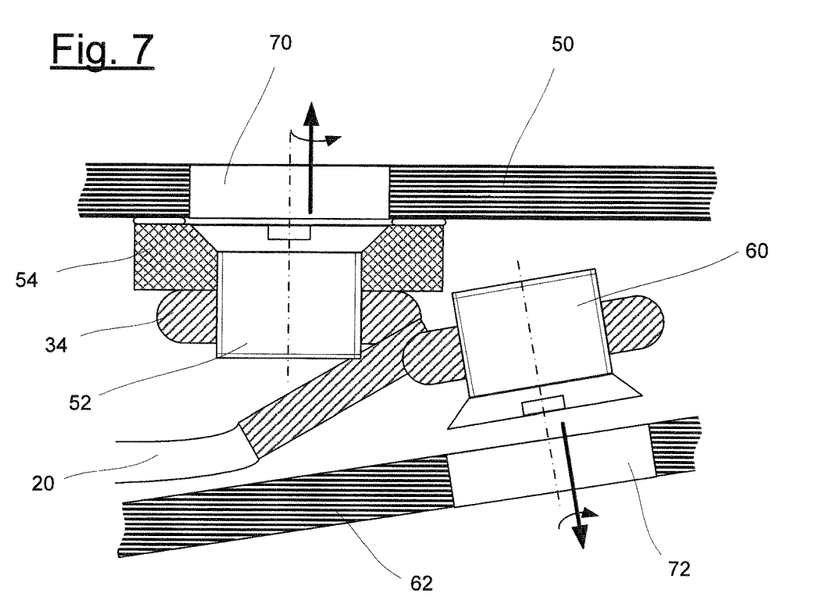

In the arrangement shown in FIG. 6, the two threaded fasteners 52, 60 are visible from the outside through the walls of the rotor blade half-shells 50, 62 so that their position can be identified visually. This enables production of the bores 70, 72 shown in FIG. 7 through the wall of the rotor blade half-shell 50 and the wall of the further rotor blade half-shell 62, respectively. The diameter of the bores 70, 72 is selected to be slightly greater than the diameter of the heads of the threaded fasteners 52, 60 so that the threaded fasteners can be unscrewed easily from the fastening rings 34, 36 and can be removed through the bores 70, 72.

Figure 8:
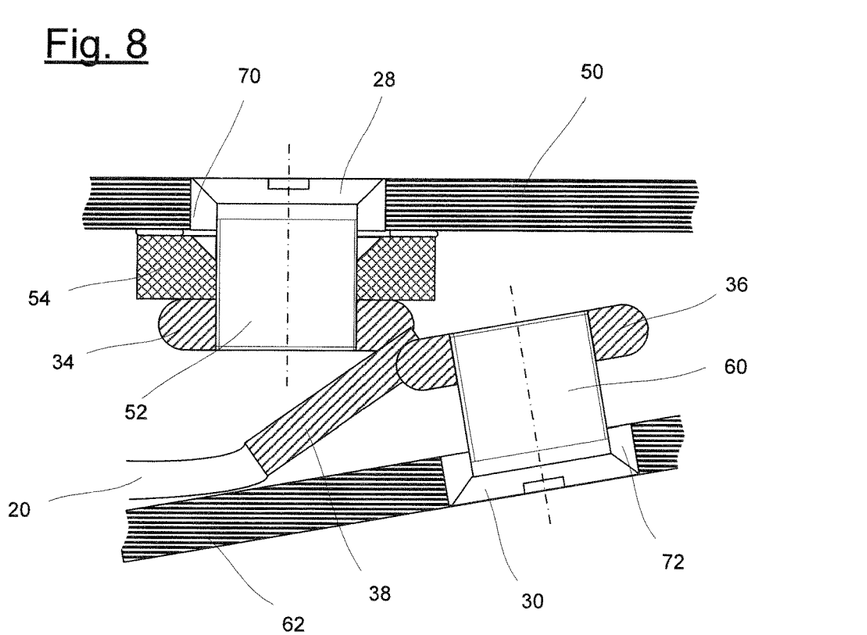

Then, the two lightning receptors 28, 30 are screwed into the internal threads 49 of the fastening rings 34, 36 through the bores 70, 72, as is illustrated in FIG. 8. The lightning receptors 28, 30 are in the form of countersunk head screws consisting of stainless steel and are screwed so far into the internal threads 40 of the fastening rings 34, 36 that their end sides terminate flush with the outer sides of the rotor blade half-shells 50, 62. The gaps remaining between the bores 70, 72 and the lightning receptors 28, 30 are filled with a permanently elastic compound.

It is understood that the foregoing description is that of the preferred embodiments of the invention and that various changes and modifications may be made thereto without departing from the spirit and scope of the invention as defined in the appended claims.

LIST OF REFERENCE SYMBOLS USED 10 wind turbine rotor blade
12 blade tip
14 blade root
16 pressure side
18 suction side
20 lightning protection conductor
22 blade tip lightning receptor
24 profile nose edge
26 heating device
28, 30 lightning receptor
32 lightning receptor base
34, 36 fastening ring
38 fastening section
40 internal thread
42 edge
43 outer side
44, 46 flattened portion
47 spacing between outer sides
48 inner side
50 rotor blade half-shell
52 first threaded fastener
54 fastening plate
56 hexagon socket
58 adhesive
60 second threaded fastener
62 further rotor blade half-shell
64 inner side
66, 68 longitudinal axis
70, 72 bore

What is claimed is:

1. A wind turbine rotor blade comprising:
a rotor blade body having a blade root, a suction side and a pressure side;
a lightning protection conductor configured to dissipate a lightning current toward said blade root;
a first lightning receptor arranged on said suction side;
a second lightning receptor arranged on said pressure side;
an integrally formed lightning receptor base;
said lightning protection conductor, said first lightning receptor and said second lightning receptor being fastened to said lightning receptor base;
said lightning receptor base having a first fastening ring and a second fastening ring;
said first fastening ring having a first internal thread;
said first lightning receptor being threadably engaged in said first internal thread;
said second fastening ring having a second internal thread;
said second lightning receptor being threadably engaged in said second internal thread;
said first and said second fastening rings each having an outer diameter and an outer side;
said first and said second fastening rings defining radial directions;
said first and said second fastening rings being arranged so as to define a spacing of less than either one of said outer diameters between their respective outer sides; and, said first fastening ring and said second fastening ring are arranged mutually adjacent to one another in a lateral direction corresponding to said radial directions of said first and second fastening rings.

2. The wind turbine rotor blade of claim 1, wherein said first and said second fastening rings each have an outer circumference and an edge radius; and, said edge radii are at least 3 mm at said respective outer circumferences.

3. The wind turbine rotor blade of claim 1, wherein:
said first fastening ring has a first longitudinal axis;
said second fastening ring has a second longitudinal axis; and,
said first and said second longitudinal axes being arranged at an angle lying in a range of 0° to 30° with respect to each other so that one of said first and said second longitudinal axes perpendicularly intersects said suction side and the other one of said first and second longitudinal axes intersects said pressure side.

4. The wind turbine rotor blade of claim 1, wherein:
said lightning receptor base has a fastening section; and, said fastening section is connected to said lightning protection conductor and is arranged between said first fastening ring and said second fastening ring.

5. The wind turbine rotor blade of claim 4, wherein said first and second fastening ring are welded to at least one of said fastening section and one another.

6. The wind turbine rotor blade of claim 1, wherein:
said first lightning receptor and said second lightning receptor each have a respective outer diameter;
said outer diameter of said first fastening ring is smaller than said outer diameter of said first lightning receptor; and,
said outer diameter of said second fastening ring is smaller than said outer diameter of said second lightning receptor.

7. The wind turbine rotor blade of claim 1, wherein said first fastening ring and said second fastening ring are tilted at an angle of 15° with respect to each other.

\* \* \* \* \*